J. B. BARTHOLOMEW.
CULTIVATOR.
APPLICATION FILED AUG. 17, 1906.
1,138,925.
Patented May 11, 1915.
2 SHEETS—SHEET 1.
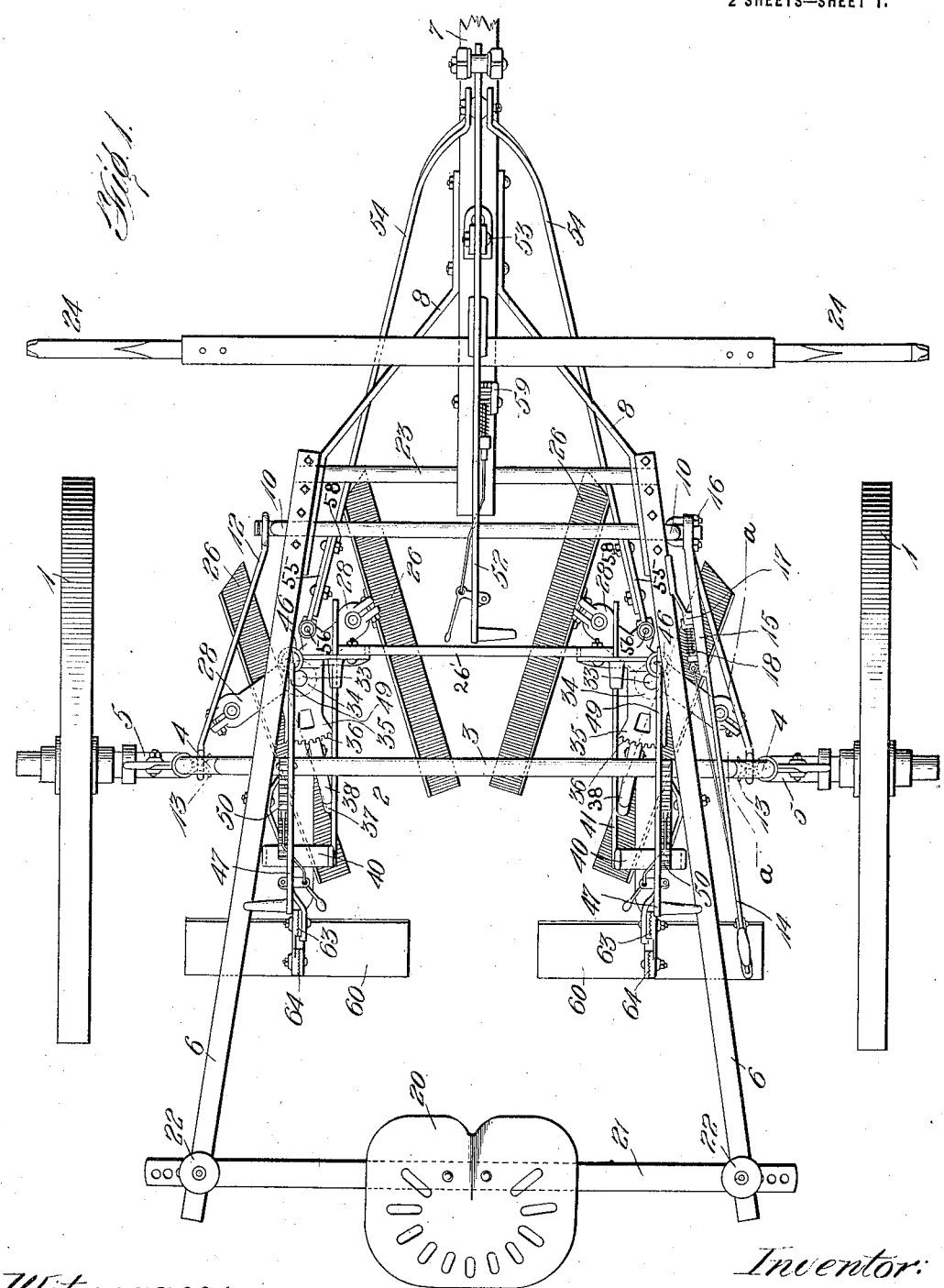

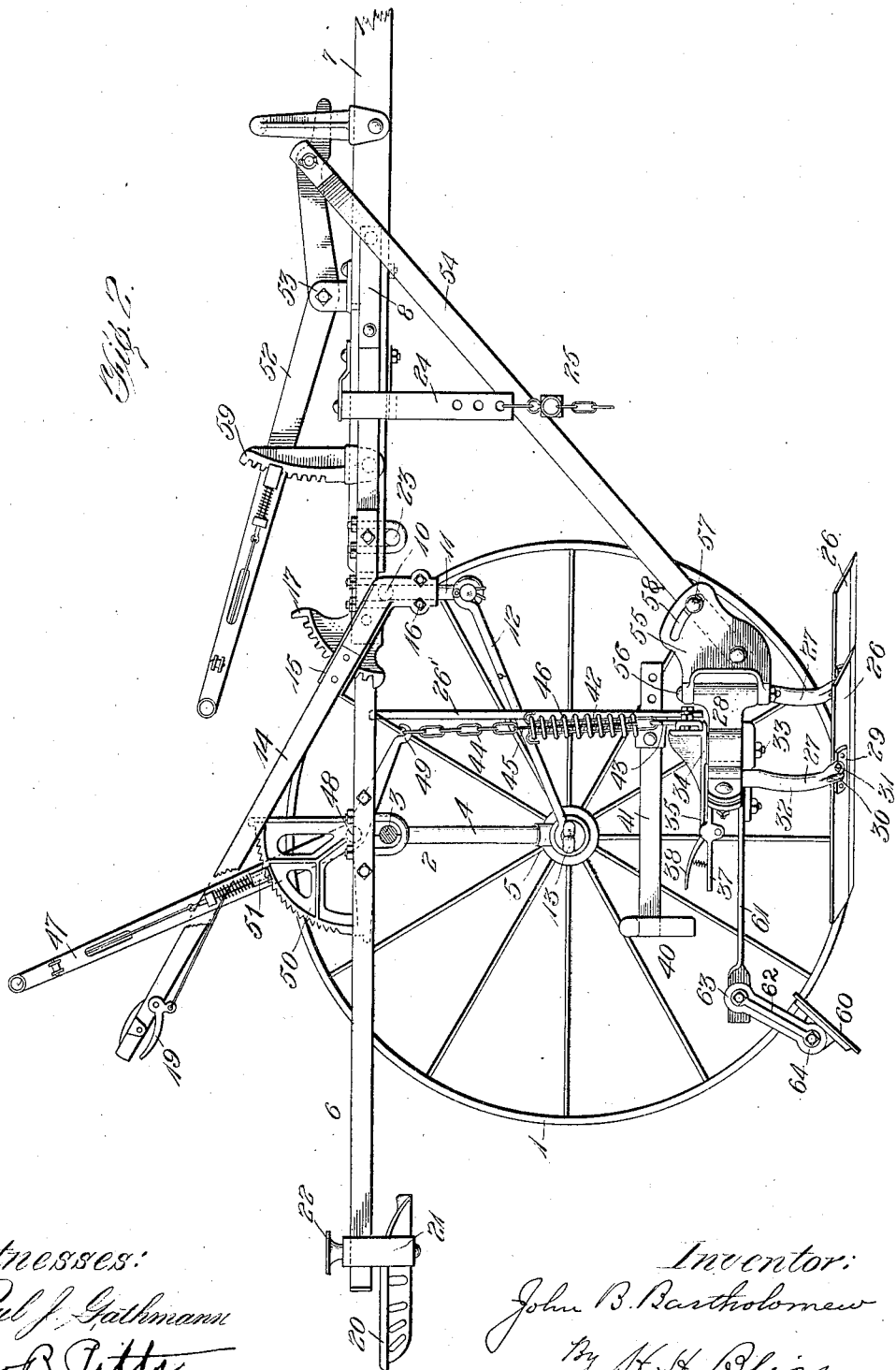

UNITED STATES PATENT OFFICE.

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

CULTIVATOR.

1,138,925.      Specification of Letters Patent.      Patented May 11, 1915.

Application filed August 17, 1906. Serial No. 331,072.

*To all whom it may concern:*

Be it known that I, JOHN B. BARTHOLOMEW, a citizen of the United States, residing at Peoria, in the county of Peoria and State of Illinois, have invented certain new and useful Improvements in Cultivators, of which the following is a specification, reference being had therein to the accompanying drawing.

This invention relates to improvements in farm implements of the class known as surface cultivators. In cultivators of this sort use is made of earth-working tools in the form of blades that are elongated horizontally and disposed and carried in such a way as to cut the weeds, grasses, and the like, and, at the same time, effect a pulverizing or mulching of the surface of the soil.

The object of my invention is to provide a machine of this character having improved means for supporting the earth-working tools and for readily adjusting their positions to meet varying requirements.

Figure 1 is a plan view of an implement embodying my improvements. Fig. 2 is a side elevation of the same.

A cultivating implement is illustrated as an entirety and although some of the parts are well known I will briefly describe them in order that a complete understanding may be had of the improvements to which this invention more particularly relates.

1—1 indicate the ground wheels upon which are supported the framework and the operative parts. These are mounted upon a crank axle 2 having the top horizontal bar 3, and a downwardly depending crank part 4. The latter are turned outward at their lower ends to provide supports for the wheels there being cast brackets at 5 secured to them at their lower bends.

The horizontal part of the main frame comprises the side longitudinal bars 6—6 which converge somewhat from the rear toward the front, 7 indicating the pole or draft device and 8—8 being brace bars which are secured to the sides of the tongue and also rigidly secured to the frame bars 6. The bars 6 of this frame rest upon and are connected to the top cross bar 3 of the crank axle the latter being adapted to rock in the connecting devices; and at their other ends the side bars are joined to a cross bar 23 upon which also rests the rear end of the tongue 7.

The crank axle is held in one position or another in relation to the frame by means of a cross crank shaft 10, the parts 11 of which are connected to the lower parts of the crank axles by the links 12, the latter being pivoted to inwardly extending lugs 13 formed on the castings 5. To the crank shaft there is connected a lever 14 there being a bracket interposed between them and indicated by 15, this bracket having downwardly turned arms which by means of U-bolts at 16 are connected to the cranks 11. At 17 there is a ratchet segment with which engages the spring-actuated detent 18 controlled by the hand latch 19. This lever extends backward at an inclination so that it can be readily reached by the driver when riding in the seat at 20 which is connected to the supporting strap 21 adapted to be adjustably fastened at one point or another along the frame bars 6 by the setting devices at 22.

By means of the lever 14 and the devices connected therewith the wheels can be adjusted forward or backward under the main frame for the purpose of compensating for varying weights of operators and also for the purpose of taking the weight off from the horses when no operator is riding.

The parts to which the horses are hitched are shown at 24 and 25. 26' is an arched bar or row-straddling bar extending from one side of the longitudinal center of the machine to the other. At the lower ends of this arched bar are attached the cultivating and scraping devices. In the machine shown there are two of these scraping or cultivating blades at each side of the machine as shown at 26. They are arranged on lines inclined to the line of draft and each is inclined from its edge outward and backward. Each is connected to a standard 27 which extends up to and is secured in a carrying bar 28. Each of the scrapers or shovels is secured to its standard by a plate 29 with an ear 30 which is clamped to the bottom of the standard 27 by a bolt 31. Each of the standards is formed with a curvature at 32 which permits the scraper or blade to be normally adjusted to the angle desired.

The carrier bar 28 is hinged at 33 by a vertical pivot to a plate 34 secured to the lower end of the arched bar and arranged substantially horizontally. This plate has a rearward extending part 35 provided with ratchet teeth 36. To the bar 28 which carries the blades there is secured a rearwardly extending lever 37 having a spring dog and lever 38, the dog being adapted to engage with the teeth at 36. By means of these devices last referred to the carrier bar 28 can be adjusted in one position or another correspondingly adjusting the angle of inclination of the blades 26 to the line of draft.

In order to give the operator more or less control of the blades, by his feet, I provide stirrups 40 secured to the rear ends of the bars 41 which are secured to the lower ends of the arched bar.

Each set of hoes or scraper blades is flexibly suspended upon devices which give the operator control of their vertical position. 42 is a bent stirrup rod connected to a hook at 43. 44 is a chain or flexible suspending device connected by a rod 45 to the lower end of a spring 46 interposed between the rod 45 and the upper hooked ends of the bent stirrup rod 42. 47 is a hand lever pivoted at 48 to the main frame and having its short arm 49 connected to the chain or suspension device 44. 50 is a ratchet segment and 51 is a spring-actuated detent on the hand lever 47.

By means of the devices last described the operator can set the hoes or scraper blades vertically at any desired position. At the same time there will be possibility for the blades to rise or descend if they require it, and the operator while in his seat can, with his foot in the stirrup at 40, cause the blades to move downward or upward as he sees fit. Furthermore, the operator can, with his feet, move the tool carriers 28 laterally and cause the tools to follow the row of plants with great nicety, this free lateral movement of the tool carriers being possible by reason of the manner in which they are supported from the main frame.

With implements of this sort I have found it very desirable to frequently vary the angle of the hoes or blades to the surface of the ground it being desirable to have them at times run more deeply and at others less. To enable the operator to quickly effect such and adjustment of the cutting angle of the blades I provide the lever 52 which is mounted well forward on the tongue at 53. Its short arm is connected by long links 54 with the carrier bar 28 for the hoes. Each link 54 at the bottom has a bracket plate 55 to which it is rigidly connected and this plate in turn is hinged at 56 to the hoe-supporting bar 28.

By varying the position of the lever 52 the operator can cause the bar 28 and the hoes to move back and be suspended in such a postion that the hoes will be more sharply inclined to the surface of the soil and, vice versa, by moving the lever in the opposite direction it will, through the links 54, draw the hoe carriers forward so that they will be in positions where they will be inclined at relatively smaller angles to the surface and will not tend to cut so deeply.

A median or normal adjustment of the angle of the hoes or blades is secured by means of the clamping devices at 57 and the slot 58 in the bracket 55, which permits the link 54 to be set at one angle or another as the occasion requires, and after that the operator still has a wide range of control through the lever 52 which can be locked in one position or another by the detent and segment 59.

60 indicates a covering or smoothing blade arranged to follow the scraper blades or hoes 26. It is held by bars 61 which extend backward from the carrier bar 28 and by intermediate link bars 62 adjustable in relation to the arm 61 by means of rose plate connections at 63 and the blades 60 being adjustable in relation to the link bars 62 by a rose plate connection at 64.

What I claim is:

1. In an implement of the class described, the combination of a main wheel-supported frame, a horizontally elongated earth-working blade, a carrier therefor, means for supporting the carrier from the main frame with freedom for lateral movement, and actuating means independent of said supporting means for moving the blade to vary its inclination to the horizontal longitudinally from end to end and for holding it in adjusted position, substantially as set forth.

2. In an implement of the class described, the combination of a main wheel-supported frame, a horizontally elongated earth-working blade, a carrier therefor, means for supporting the carrier from the main frame with freedom for lateral movement, and means mounted on the wheel-supported frame independent of the aforesaid supporting means for varying the inclination to the horizontal of the blade longitudinally from end to end, substantially as set forth.

3. In an implement of the class described, the combination of a main wheel-supported frame, a horizontally elongated earth-working blade, a carrier therefor, means for suspending the carrier from the main frame with freedom for lateral movement, means for actuating said suspending means to raise and lower the carrier, and actuating means independent of the suspending means for moving the blade to vary its inclination to the horizontal longitudinally from end to end and for holding it in adjusted position, substantially as set forth.

4. In an implement of the class described, the combination of a main wheel-supported frame, a horizontally elongated earth-working blade, a carrier therefor, means for suspending the carrier from the main frame with freedom for lateral movement, means for actuating said suspending means to raise and lower the carrier, and means mounted on the wheel-supported frame independent of the suspending means for varying the inclination to the horizontal of the blade longitudinally from end to end, substantially as set forth.

5. In an implement of the class described, the combination of a main wheel-supported frame, a horizontally elongated earth-working blade, a carrier therefor, means for supporting the carrier from the main frame and adjusting said carrier and the blade bodily up and down, and actuating means independent of the said supporting and adjusting means for moving the blade to vary its inclination to the horizontal longitudinally from end to end and for holding it in adjusted position, substantially as set forth.

6. In an implement of the class described, the combination of a main wheel-supported frame, a horizontally elongated earth-working blade, a carrier therefor, means for supporting the carrier from the main frame and adjusting said carrier and the blade bodily up and down, and means mounted on the wheel-supported frame independent of the said supporting and adjusting means for varying the inclination to the horizontal of the blade longitudinally from end to end, substantially as set forth.

7. In an implement of the class described, the combination of a main wheel-supported frame, a horizontally elongated earth-working blade, a carrier therefor, means for supporting the carrier from the main frame, a drag bar connected at its front end to the main frame and at its rear end to the carrier, and means on the main frame independent of the carrier-supporting means for adjusting the position of the drag bar to vary the inclination to the horizontal of the blade longitudinally from end to end, substantially as set forth.

8. In an implement of the class described, the combination of a main wheel-supported frame, a horizontally elongated earth-working blade, a carrier therefor, means for supporting the carrier from the main frame, a drag bar connected at its front end to the main frame and having at its rear end an adjustable connection with the carrier adapted to permit an adjustment of the carrier to vary the inclination to the horizontal of the blade longitudinally from end to end, and means on the main frame independent of the carrier-supporting means and operable at will for adjusting the position of the drag bar to vary the inclination to the horizontal of said blade longitudinally from end to end, substantially as set forth.

9. In an implement of the class described, the combination of a main wheel supported frame, a horizontally elongated earth-working blade, a carrier therefor, means for supporting the carrier from the main frame with freedom for lateral movement, means for adjusting the carrier in horizontal planes to vary the inclination of the blade to the lines of draft, and actuating means independent of the said supporting means for moving the blade to vary its angle of inclination to the horizontal longitudinally from end to end and for holding it in adjusted position, substantially as set forth.

10. In an implement of the class described, the combination of a main wheel supported frame, a horizontally elongated earth-working blade, a carrier therefor, means for supporting the carrier from the main frame with freedom for lateral movement, means for actuating the supporting means to adjust the carrier and blade up and down, means for adjusting the blade in horizontal planes relative to the lines of draft, and actuating means independent of the carrier supporting means for adjusting the inclination to the horizontal of the blade and carrier longitudinally from end to end and for holding it in adjusted position, substantially as set forth.

11. The combination of the main frame, the arm 52 pivotally mounted thereon and adjustably fixed in angular position with respect thereto, the tool carrying frame, the bar 54 pivotally connected at its forward end to the arm 52, and rigidly secured at its lower end to the tool carrying frame, its said connection with the tool carrying frame being adjustable to vary the angle of inclination thereof with respect to the horizontal along lines longitudinal of the machine, a flexible supporting device adjustably secured to the main frame at its upper end and secured to the tool carrying frame at its lower end, and elongated earth-working blades carried by the said tool carrying frame.

12. In an implement of the class described, the combination of a main wheel-supported frame, a horizontally elongated earth-working blade, a carrier therefor, means for supporting the carrier from the main frame with freedom for lateral movement, means for adjusting the carrier in horizontal planes to vary the inclination of the blade to the lines of draft, and means mounted on the wheel-supported frame independent of the aforesaid supporting means for varying the angle of inclination to the horizontal of said blade longitudinally from end to end, substantially as set forth.

13. In an implement of the class described, the combination of a main wheel-supported frame, a horizontally elongated earth-working blade, a carrier therefor, means for supporting the carrier from the main frame with freedom for lateral movement, means for actuating the supporting means to adjust the carrier and blade up and down, means for adjusting the blade in horizontal planes relative to the lines of draft, and means mounted on the wheel-supported frame independent of the carrier supporting means for adjusting the inclination to the horizontal of the blades and carrier longitudinally from end to end, substantially as set forth.

In testimony whereof I affix my signature, in presence of two witnesses.

JOHN B. BARTHOLOMEW.

Witnesses:
 GEO. T. KLEIN,
 JULIA GORSLINE.